US008676690B1

(12) United States Patent  
Sprague et al.

(10) Patent No.: US 8,676,690 B1  
(45) Date of Patent: Mar. 18, 2014

(54) MANAGEMENT OF RELATED PORTFOLIOS

(71) Applicants: Douglas Sprague, Pembroke, MA (US); Mark Steven McEachern, Holliston, MA (US); Stewart John Carpenter, Arlington, MA (US); Walter Tsui, Wellesley, MA (US); Kevin MacDermott, Boston, MA (US); Eugene Wong, Chestnut Hill, MA (US)

(72) Inventors: Douglas Sprague, Pembroke, MA (US); Mark Steven McEachern, Holliston, MA (US); Stewart John Carpenter, Arlington, MA (US); Walter Tsui, Wellesley, MA (US); Kevin MacDermott, Boston, MA (US); Eugene Wong, Chestnut Hill, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/706,626

(22) Filed: Dec. 6, 2012

Related U.S. Application Data

(60) Provisional application No. 61/731,414, filed on Nov. 29, 2012.

(51) Int. Cl.  
*G06Q 40/06* (2012.01)  
*G06Q 40/00* (2012.01)

(52) U.S. Cl.  
USPC .......................................... 705/36 R; 705/35

(58) Field of Classification Search  
USPC ................................................. 705/35, 36 R  
See application file for complete search history.

(56) References Cited

U.S. PATENT DOCUMENTS

| | | | | |
|---|---|---|---|---|
| 5,806,048 | A * | 9/1998 | Kiron et al. ................. | 705/36 R |
| 7,552,079 | B2 * | 6/2009 | Bove et al. .................. | 705/36 R |
| 2001/0011243 | A1 * | 8/2001 | Dembo et al. ................... | 705/36 |
| 2003/0093352 | A1 * | 5/2003 | Muralidhar et al. ............. | 705/36 |
| 2007/0299758 | A1 * | 12/2007 | Zosin et al. ................. | 705/36 R |
| 2008/0162377 | A1 * | 7/2008 | Pinkas ......................... | 705/36 R |
| 2008/0183638 | A1 * | 7/2008 | Chigirinskiy et al. ...... | 705/36 R |
| 2011/0184884 | A1 * | 7/2011 | Lyons et al. ................ | 705/36 R |
| 2012/0116994 | A1 * | 5/2012 | Michaud et al. ............. | 705/36 R |

* cited by examiner

*Primary Examiner* — Elda Milef  
(74) *Attorney, Agent, or Firm* — Fish & Richardson P.C.

(57) ABSTRACT

A computer-implemented method comprising: retrieving information indicative of sets of upper level portfolios; retrieving information indicative of a plurality of objectives for the sets of upper level portfolios; retrieving a plurality of constraints, with at least one of the constraints restricting aggregate trade amounts for the same lower level portfolio across the sets of upper level portfolios, and with a constraint comprising a parameter that is at least partly based on an objective and attributes of the sets of upper level portfolios; and executing by one or more computer systems a collection of optimization rules to apply across the sets of upper level portfolios to current trade amounts of the sets of upper level portfolios and to the objectives according to parameters specified by the constraints to determine rebalanced trade amounts for the sets of upper level portfolios.

20 Claims, 5 Drawing Sheets

US 8,676,690 B1

MANAGEMENT OF RELATED PORTFOLIOS

CLAIM OF PRIORITY

This application claims priority under 35 U.S.C. §119(e) to U.S. Provisional Patent Application No. 61/731,414, filed Nov. 29, 2012, the entire contents of which are hereby incorporated by reference.

BACKGROUND

This invention generally relates to computer-based rebalancing of financial portfolios.

A portfolio is a collection of investments held by an investment company, a hedge fund, a financial institution and/or an individual. The investments in a portfolio may include stocks, bonds, cash, and so forth.

SUMMARY

According to an aspect, a computer-implemented method comprises: retrieving information indicative of sets of upper level portfolios, with an upper level portfolio including a plurality of lower level portfolios, with the sets of upper level portfolios including at least a first set and a second set, and with a first upper level portfolio in the first set and a second upper level portfolio in the second set each including a same lower level portfolio; retrieving information indicative of a plurality of objectives for the sets of upper level portfolios; retrieving a plurality of constraints, with at least one of the constraints restricting aggregate trade amounts for the same lower level portfolio across the sets of upper level portfolios, and with a constraint comprising a parameter that is at least partly based on an objective and attributes of the sets of upper level portfolios; and executing by one or more computer systems a collection of optimization rules to apply across the sets of upper level portfolios to current trade amounts of the sets of upper level portfolios and to the objectives according to parameters specified by the constraints to determine rebalanced trade amounts for the sets of upper level portfolios.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. Implementations may include one or more of the following features. In some implementations, the method further includes determining, based on executing, metrics indicative of trade warnings; based on the trade warnings, selecting new constraints and new objectives; and re-executing by the one or more computer systems the collection of optimization rules to apply across the sets of upper level portfolios to current trade amounts of the sets of upper level portfolios and to the new objectives according to the new constraints to determine new rebalanced trade amounts for the sets of upper level portfolios.

In other implementations, the method includes determining one or more trades to be executed for the rebalanced trade amounts. In still other implementations the objectives comprise: an asset class alignment objective for decreasing differences among trade amounts of an asset class in a portfolio and target trade amounts of the asset class, e.g., relative to differences among trade amounts of the asset class and the target trade amounts of the asset class prior to rebalancing; a peer consistency objective for decreasing across peer upper level portfolios differences among trade amounts in lower level portfolios and target trade amounts, e.g., relative to differences across the peer upper level portfolios among trade amounts in lower level portfolios and target trade amounts prior to rebalancing; wherein at least two upper level portfolios in the sets are peer upper level portfolios; a family consistency objective for decreasing differences among lower level portfolios' trade amounts and target trade amounts across a portfolio family, e.g., relative to differences among lower level portfolios' trade amounts and target trade amounts across the portfolio family prior to rebalancing, wherein at least one of the sets includes a portfolio family; a portfolio alignment objective for decreasing differences among lower level portfolios' trade amounts to a target trade amount, with the lower level portfolios being in a particular upper level portfolio, relative to differences among lower level portfolios' trade amounts to the target trade amount prior to rebalancing; and a trade cost objective for decreasing trade costs associated with management of the upper level portfolios in accordance with the objectives and the constraints.

In yet other implementations, the rebalanced trade amounts are optimized trade amounts given the constraints and the objectives. In other implementations, the constraints comprise: a trade limitation constraint for limiting trade of the lower level portfolios across upper level portfolios in the sets; an asset class alignment tolerance constraint for limiting differences among amounts of asset classes held in a lower level portfolio and objective amounts of the asset classes; and a portfolio objective alignment tolerance constraint for limiting differences among actual trade amounts of a lower level portfolio and target trade amounts. In still other implementations, the sets of upper level portfolios are portfolio families.

DETAILED DESCRIPTION

Figure 1:
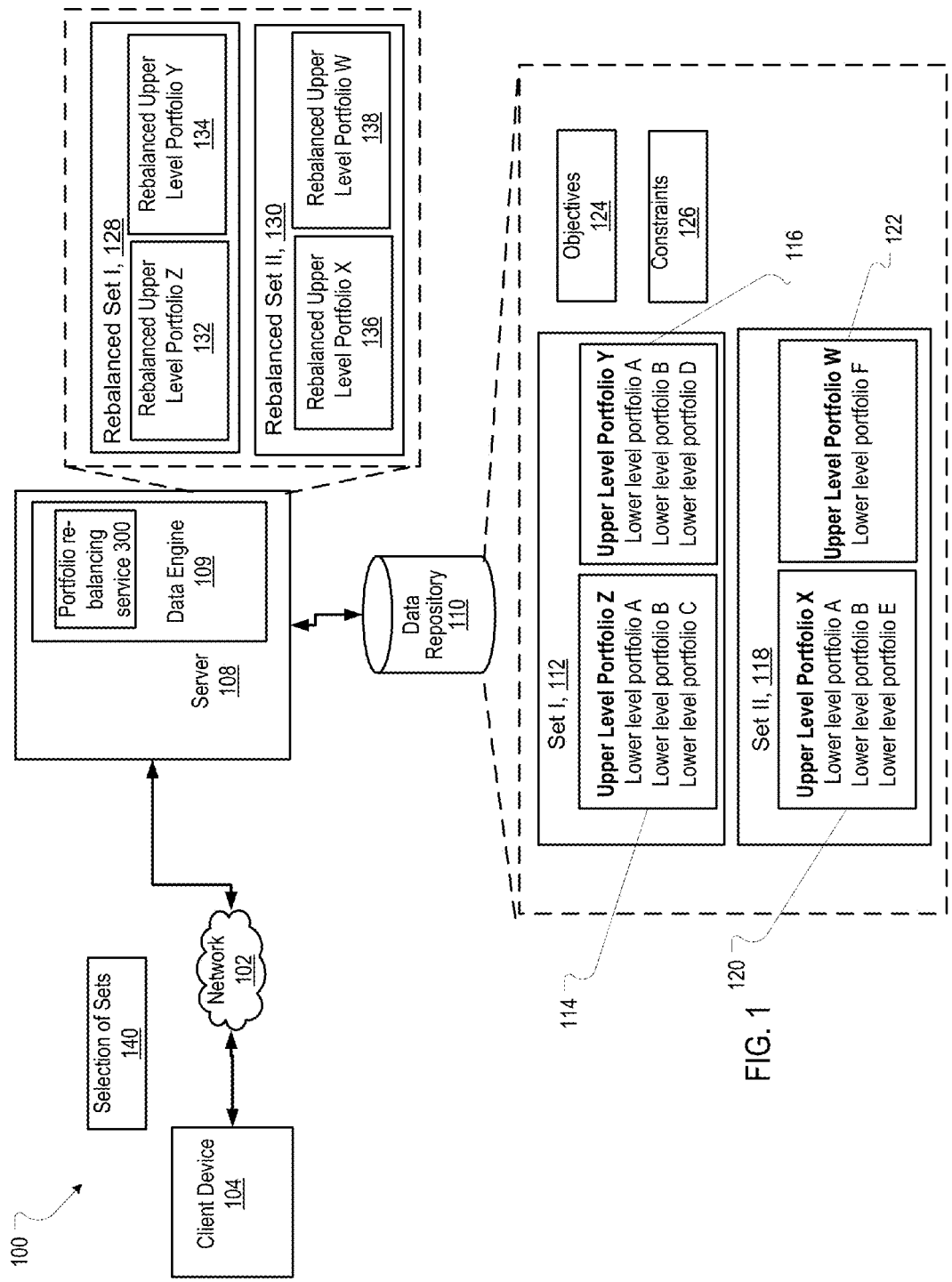
FIG. 1 is a block diagram of a system for rebalancing of portfolios.

A computerized system maintains information indicative of upper level portfolios and lower level portfolios. An upper level portfolio is a financial portfolio that includes other financial vehicles, products, financial portfolios, and so forth. An example of an upper level portfolio is a portfolio of portfolios, a portfolio of one or more of securities, mutual funds, stocks, bonds, cash, exchange traded funds (ETFs), and so forth. A lower level portfolio is a portfolio that is included in an upper level portfolio. An example of a lower level portfolio is a portfolio (e.g., funds, ETFs, a credit sleeve, and so forth), a collection of securities, and so forth. Top level portfolios are related to each other when the top level portfolios include a same underlying low level portfolio and/or have one or many objectives that can be applied to the top level portfolios because current holdings/trade amounts are equal distance from a target. The computer system manages related top level portfolios in accordance with various objectives and constraints, e.g., to promote various investment goals.

A portfolio is associated with various attributes, including, e.g., holdings, targets, and trade amounts (e.g., amounts of a lower level holding being purchased or sold on a given day). Generally, an attribute includes a quality and/or a characteristic. Holdings, targets and trade amounts can each be expressed in absolute dollar terms or as percentages. Generally, a holding is particular financial product that is held (e.g., included) in a portfolio. Generally, a target includes a desired state (e.g., desired weights of underlying holdings, desired risk level for the TLP, and so forth).

For example, a target may include a restriction to promote the desired state, e.g., a restriction on an amount or a type of financial product that is included in a portfolio. There are various types of targets, including, e.g., limits on an amount of funds related to a particular industry sector that may be held in a portfolio, limits (e.g., asset class limits and dollar amount limits) that are based on benchmark positions, a risk target indicative of a desired amount of risk to be assumed in a portfolio, limits on an amount of an asset class, limits on a position-level for an asset class and/or a financial product, exclusion of particular funds or asset classes from a portfolio, limits on a dollar amount of a particular fund that may be held in a portfolio, limits on a dollar amount of a particular lower level portfolio that may be held in an upper level portfolio, minimum and maximum dollar amount limits for particular types of holdings in a portfolio, a restriction to not sell/buy funds that are at trading limits, and so forth. Generally, an asset class includes a categorization of lower level holdings, as such an asset class may apply to industries, sectors, and so forth. Generally, a risk target is based on a risk metric, which is an attribute of a portfolio, either before or after a trade. The system has targets for risk metrics at the TLP level, and a risk objective would be trading in order to get closer to the risk targets.

The computer system also manages objectives, including, e.g., mathematical functions for which an optimization algorithm is generating a solution. As described below, examples of these mathematical functions are provided in the below Table 1. In an example, an objective includes decreasing (e.g., minimizing) deviations of actual trade amounts from target trade amount, decreasing deviations of actual trade amounts from peer trade amounts, minimizing net flows for lower level portfolios, and so forth. There are also other various types of objectives, including, e.g., an objective to increase alignment of individual lower level portfolios in a particular upper level portfolio with various targets, an objective to increase alignment across various upper level portfolios with the various targets, an objective to increase alignment of individual lower level portfolios (independent of a particular upper level portfolio) with various targets, and so forth.

Generally, a constraint includes a parameter that is based on an objective and one or more attributes of a portfolio (e.g., a holding, a target and/or a trade amount). There are various types of constraints, including, e.g., a constraint to not let the trade amount for a given holding exceed a dollar amount, a constraint to trade top level portfolios such that a maximum deviation from a target is a predefined percentage, warning limits (e.g., a warning that proposed trades may cause a portfolio to exceed trade limits), and so forth. There are both hard constraints (e.g., a constraint that absolutely may not be exceeded) and soft constraints (e.g., a constraint for which the management system promotes compliance). Using the constraints, the targets, and the objectives, the computerized system determines positions and/or trade amounts for the upper level portfolios that promote achievement of the objectives, given the constraints that are applied across the related upper level portfolios. Referring now to FIG. 1, an example system 100 implementing a portfolio rebalancing service 300 (FIG. 3) is shown. System 100 includes a network 102, a client device 104, a server 108 and a data repository 110. The client device 104 and server 108 communicate with each other over network 102 and can run programs having a client-server relationship to each other.

Server 108 implements data engine 109 that executes a portfolio rebalancing service (300). Data repository 110 maintains various sets of portfolios, including, e.g., set 112 and set 118. A set of portfolios is a collection of multiple portfolios. A set of portfolios may include a portfolio family, as described in further detail below. Set 112 includes upper level portfolios 114, 116. Upper level portfolio 114 includes lower level portfolios A, B and C. Upper level portfolio 116 includes lower level portfolios A, B and D. Upper level portfolios 114, 116 are related to each other, because each of upper level portfolios 114, 116 includes one or more of the same lower level portfolios (e.g., lower level portfolios A and B).

Set 118 includes upper level portfolios 120, 122. Upper level portfolio 120 includes lower level portfolios A, B and E. Upper level portfolio 122 includes lower level portfolio F. Set 118 is related to set 112, because each of sets 112, 118 include one of more of the same lower level portfolios, namely, lower level portfolios A and B. Similarly, upper level portfolio 120 is related upper level portfolios 114, 116, because each of upper level portfolios 114, 116, 120 includes one of more of the same lower level portfolios, namely, lower level portfolios A and B.

Data repository 110 also maintains constraints 126, e.g., restrictions on the contents of sets 112, 118, upper level portfolios 114, 116, 120, 122, and the underlying lower level portfolios (e.g., lower level portfolios A, B, C, D, E, F). Constraints 126 are applicable to the trade amounts of sets 112, 118, upper level portfolios 114, 116, 120, 122, and the underlying lower level portfolios. Data repository 110 also maintains objectives 124, including, e.g., information indicative of one or more objectives to be promoted during rebalancing of sets 112, 118. Objectives 124 are applicable to the trade amounts of sets 112, 118, upper level portfolios 114, 116, 120, 122, and the underlying lower level portfolios.

Data engine 109 selects various sets of upper level portfolios on which to perform rebalancing. In FIG. 1, client device 104 sends information 140 to server 108. Information 140 specifies a selection of sets for rebalancing. Information 140 specifies that a user (not shown) of client device 104 has selected sets 112, 118 for rebalancing. Using objectives 124 and constraints 126, data engine 109 applies an optimization algorithm discussed below to positions held in the aggregate across upper level portfolios 114, 116, 120, 122. The optimization algorithm is a series of instructions that are executed by a computer to identify a best element (with regard to criteria) from some set of available alternatives. An exemplary platform on which the optimization algorithm is executed is the IBM ILOG CPLEX Optimizer available from IBM, Inc. Armonk N.Y. Other optimization platforms could be used. In an example, constraints, targets, and/or objectives are used as parameters in the optimization algorithm.

Data engine 109 implements an optimization algorithm based on the objectives specified in Table 1.

TABLE 1

| Objective | Description | Algorithmic Expression |
|---|---|---|
| Asset Class Alignment | decrease differences among current trade amounts of asset classes and a target trade amount of the asset classes | Decrease: $(W-T)^2$ for each asset class |
| Peer Consistency | decrease differences among lower level portfolio's current trade amounts and target trade amounts across peer upper level portfolios, with the lower level portfolios included in peer upper level portfolios | Decrease: $((W_{LLP1}-T_{LLP1}) - (W_{LLP2}-T_{LLP2}))^2$ |
| Portfolio Family Consistency | decrease differences among lower level portfolios' current trade amounts and target trade amounts across upper level portfolios in a portfolio family | Decrease: $((W_{LLP1(TLP1)}-T_{LLP1(TLP1)})-(W_{LLP1(TLP2)}-T_{LLP1(TLP2)}))^2$ for each combination in a portfolio family |
| Portfolio Alignment | decrease differences among lower level portfolios' current trade amounts and a target trade amount, with the lower level portfolios being in a particular upper level portfolio | Decrease: $(W-T)^2$ for each portfolio |
| Trade cost | decrease trade costs | Decrease: $((W-W_{pre})^2 \times \$_{TNA\_TLP} \times \text{Ratio}_{expense})$ for each LLP in a TLP |

As shown in Table 1, one of the types of objectives is an asset class alignment objective for decreasing a delta (i.e., difference) among trade amounts of an asset class (in a lower level portfolio or in an upper level portfolio) and a target trade amount of the asset class, e.g., relative to the difference among trade amounts of the asset class and a target trade amount of the asset class prior to rebalancing. The algorithmic expression for an asset class alignment objective is $(W-T)^2$, where W represents a current amount of a financial product held in a portfolio and T represents a target amount of the financial product.

Another type of objective is a peer consistency objective for decreasing across peer upper level portfolios differences among trade amounts in lower level portfolios and target trade amounts, e.g., relative to differences across peer upper level portfolios among trade amounts in lower level portfolios and target trade amounts prior to rebalancing. The algorithmic expression for a peer consistency objective is $((W_{LLP1}-T_{LLP1})-(W_{LLP2}-T_{LLP2}))^2$, where $W_{LLP1}$ represents a current amount (e.g., a weight) of a financial product is held in a first lower level portfolio (LLP1) in a first upper level portfolio and $T_{LLP1}$ represents a target amount of the financial product in the first lower level portfolio. $W_{LLP2}$ represents a current amount of a financial product held in a second lower level portfolio (LLP2) in a second upper level portfolio that is a peer to the first upper level portfolio, and $T_{LLP2}$ represents a target amount of the financial product in the second lower level portfolio (LLP2).

Another type of objective is a portfolio family consistency objective. A portfolio family includes a set of upper level portfolios that each includes one or more of the same underlying lower level portfolios, with each upper level portfolio being for a particular year. The portfolio family consistency objective promotes a decrease in differences among lower level portfolios' trade amounts and target trade amounts across a portfolio family, e.g., relative to differences among lower level portfolios' trade amounts and target trade amounts across the portfolio family prior to rebalancing. The algorithmic expression for a portfolio family consistency objective is $((W_{LLP1(TLP1)}-T_{LLP1(TLP1)})-(W_{LLP1(TLP2)}-T_{LLP1(TLP2)}))^2$, where $W_{LLP1(TLP1)}$ represents a current amount (e.g., a weight) of a financial product held in a first lower level portfolio (LLP1) in a first upper level portfolio (TLP1) and $T_{LLP1(TLP1)}$ represents a target amount of the financial product in the first lower level portfolio in the first upper level portfolio. $W_{LLP1(TLP2)}$ represents a current amount of a financial product held in a first lower level portfolio (LLP1) in a second upper level portfolio (TLP2) that is in the same portfolio family as first upper level portfolio. $T_{LLP1(TLP2)}$ represents a target amount of the financial product in the first lower level portfolio (LLP1) in the second upper level portfolio.

Another type of objective is a portfolio alignment target for decreasing is differences among lower level portfolios' trade amounts to a target trade amount, with the lower level portfolios being in a particular upper level portfolio, relative to the difference among lower level portfolios' trade amounts to the target trade amount prior to rebalancing. Still another type of objective is a trade cost objective for decreasing trade costs associated with management of the upper level portfolios. The algorithmic expression for a trade cost objective is $((W-W_{pre})^2 \times \$_{TNA\_TLP} \times \text{Ratio}_{expense}$, where W represents a current amount (weighting) of a particular trade amount (and/or asset class) in a portfolio (e.g., an upper level portfolio, a lower level portfolio, etc.), $\$_{TNA\_TLP}$ represents the total net assets (TNA) of the upper level portfolio, $W_{pre}$ represents current trade amounts of the lower level portfolio prior to rebalancing, and $Ratio_{expense}$ represents a ratio of a portfolio's operating expenses to the average dollar value of its assets under management.

Constraints 126 include the constraints shown in Table 2:

TABLE 2

| Constraint | Description | Algorithmic Expression |
| --- | --- | --- |
| Trade limitations | Limit the trade of lower level portfolios in aggregate across upper level portfolios | $(((W_{pre} - W) \times \$_{TNA\_TLP}) + \ldots) <= $ Trade $Limit_{LLP}$ |
| Asset class alignment tolerance | Limit the delta from target for an asset class | $(W_{AC} - T_{AC}) <= $ Asset Class Alignment Tolerance |
| Portfolio Target Alignment Tolerance | Limit the delta from target for a LLP | $(W-T) <= $ Portfolio Alignment Tolerance |

As shown in Table 2, one type of constraint is a trade limitation constraint for limiting the trade of lower level portfolios in the aggregate across upper level portfolios. The trade limitation constraint specifies that the amount traded (represented as $((W_{pre}-W) \times \$_{TNA\_TLP})$) is less than or equal to a trade limit for a lower level portfolio. A trade limit specifies an amount of a particular type of financial product that may be traded. As previously described, W represents a current amount (weighting) of a particular trade amount (and/or asset class) in a portfolio (e.g., an upper level portfolio, a lower level portfolio, etc.), $\$_{TNA\_TLP}$ represents the total net assets (TNA) of the upper level portfolio, $W_{pre}$ represents current trade amounts of the lower level portfolio prior to rebalancing. Another type of constraint is an asset class alignment tolerance constraint for limiting the difference between an amount of an asset class held in a lower level portfolio and a target amount of the asset class. The algorithmic expression for asset class alignment tolerance constraint is $(W_{AC}-T_{AC})$ <=Asset Class Alignment Tolerance. $W_{AC}$ is a current amount of is an asset class in a lower level portfolio. $T_{AC}$ is a target amount of the asset class in the lower level portfolio. An asset class alignment tolerance is a predefined value that specifies an amount by which a current amount of an asset class in a lower level portfolio may differ from a target amount.

Another type of constraint is a portfolio target alignment tolerance constraint for limiting the difference among actual trade amounts of a lower level portfolio and target trade amounts. The algorithmic expression for the portfolio target alignment tolerance constraint is (W−T)<=Portfolio Alignment Tolerance. A portfolio alignment tolerance is a predefined value that specifies an amount by which current trade amounts of a lower level portfolio may differ from target trade amounts. This value is empirically determined, e.g., by a portfolio manager or through other mechanisms.

In an example, objectives 124 include the objectives shown in the above Table 1 and constraints 126 include the constraints shown in the above Table 2. Using objectives 124 and constraints 126, data engine 109 implements an optimization algorithm to promote attainment of objectives 124 given constraints 126. The optimization algorithm depicted in Table 3 determines positions for the upper level portfolios that decrease (e.g., minimize) values specified by objectives 124 given constraints 126.

TABLE 3

DECREASE:
 $Weight_1 \times (W_{AC}-T_{AC})^2$ for each asset class
 $Weight_2 \times (W_{LLP1}-T_{LLP1})-(W_{LLP2}-T_{LLP2}))^2$
 $Weight_3 \times (W_{LLP1(TLP1)}-T_{LLP1(TLP1)})-(W_{LLP1(TLP2)}-T_{LLP1(TLP2)}))^2$ for each TABLE 3-continued combination in a portfolio family TABLE 3-continued $Weight_4 \times (W-T)^2$ for each portfolio
 $Weight_5 \times ((W-W_{pre})^2 \times \$_{TNA\_TLP} \times Ratio_{expense})$ for each LLP in a TLP
SUBJECT TO:
 $(((W_{pre} - W) \times \$_{TNA\_TLP}) + \ldots) <= $ Trade $Limit_{LLP}$
 $(W_{AC}-T_{AC}) <= $ Asset Class Alignment Tolerance
 (W-T) <= Portfolio Alignment Tolerance As shown in Table 3, the optimization algorithm rebalances families of upper level portfolios to decreases values that are specified by objectives 124, e.g., relative to values that are specified by objectives 124 prior to rebalancing. The values specified by objectives 124 include $(W_{AC}-T_{AC})^2$, $((W_{LLP1}-T_{LLP1})-(W_{LLP2}-T_{LLP2}))^2$, $(W_{LLP1(TLP1)}-T_{LLP1(TLP1)})-(W_{LLP1(TLP2)}-T_{LLP1(TLP2)}))^2$, $(W-T)^2$ and $((W-W_{pre})^2 \times \$_{TNA\_TLP} \times Ratio_{expense})$. These values may be weighted (e.g., through application of $weights_{1-5}$) to specify a relative importance of each of these values relative to each other. Other objectives and constraints could be used in the optimization algorithm, including, e.g., the other objectives and constraints described above.

Based on implementation of the optimization algorithm, data engine 109 rebalances the positions of upper level portfolios 114, 116, 120, 122. In an example, data engine 109 rebalances the position of upper level portfolios 114, 116, 120, 122 by determining optimal allocations of incoming cash flows to achieve the positions specified by the rebalance. Upper level portfolios 114, 116, 120, 122 with the rebalanced positions include rebalanced sets 128, 130, with rebalanced upper level portfolios 132, 134, 136, 138. In rebalancing the positions, data engine 109 determines amounts of particular financial products (and/or types of financial products) to be purchased, traded and/or sold in accordance with the rebalancing of the upper level portfolios.

While the above examples have been described with regards to rebalancing of portfolios, the techniques described herein are equally applicable to management of cash flows, e.g., rather than rebalances. Management of cash flows includes inflows, which may be represented as excess cash, and outflows, which may be represented as withdrawals. Generally, cash flows include incoming and outgoing funds (e.g., dollars) to a portfolio. Using the targets, objectives and constraints described herein, system 100 implements the optimization algorithm to determine lower-level securities that should be purchased and/or sold, e.g., based on an optimal allocation of cash flows.

Server 108 may also evaluate the incremental benefit of rebalancing the upper level portfolios relative to the incremental cost of rebalancing the upper level portfolios. The incremental benefit includes a percentage decrease in deviation from target trade amounts with regarding to positioning or risk. The incremental cost of rebalancing the upper level portfolios includes additional trading costs that are incurred through the rebalancing of the upper level portfolios. The server 108 rebalances the upper level portfolios when the incremental benefit exceeds the incremental costs by a threshold amount (e.g., a predefined amount).

Figure 2A:
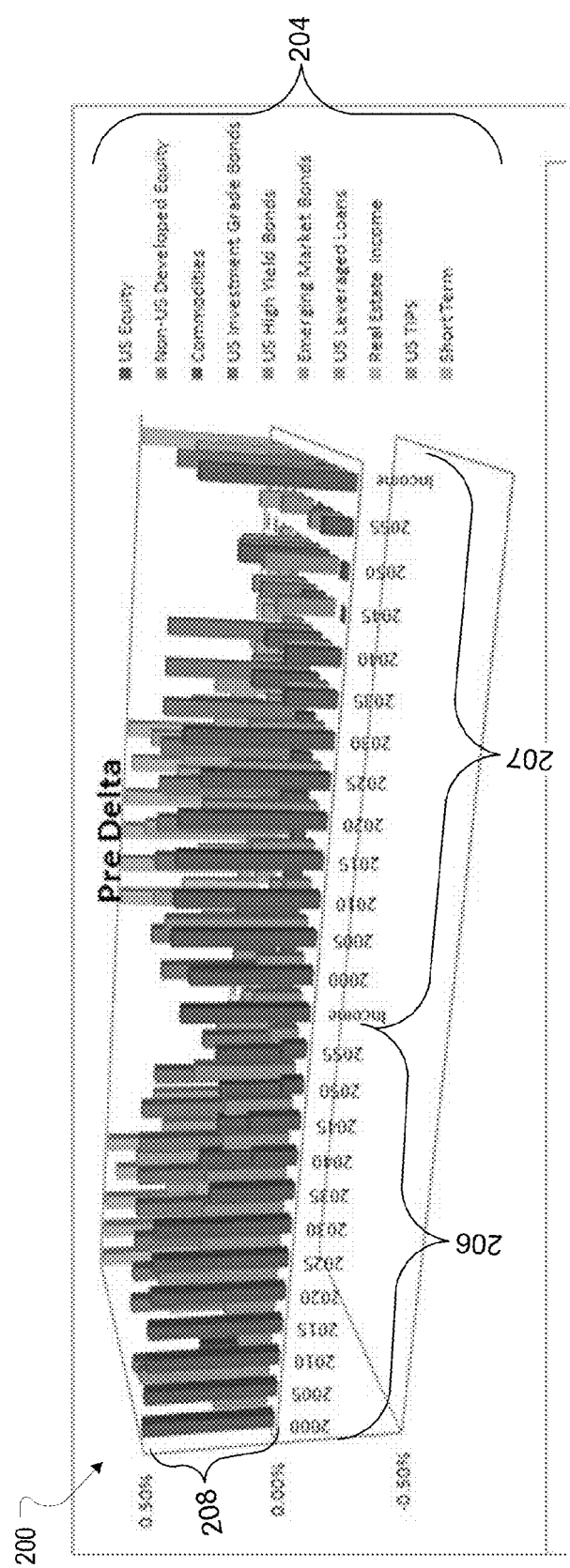
FIGS. 2A, 2B are perspective bar graphs of percentage differences from objective values across portfolios.
Figure 2B:
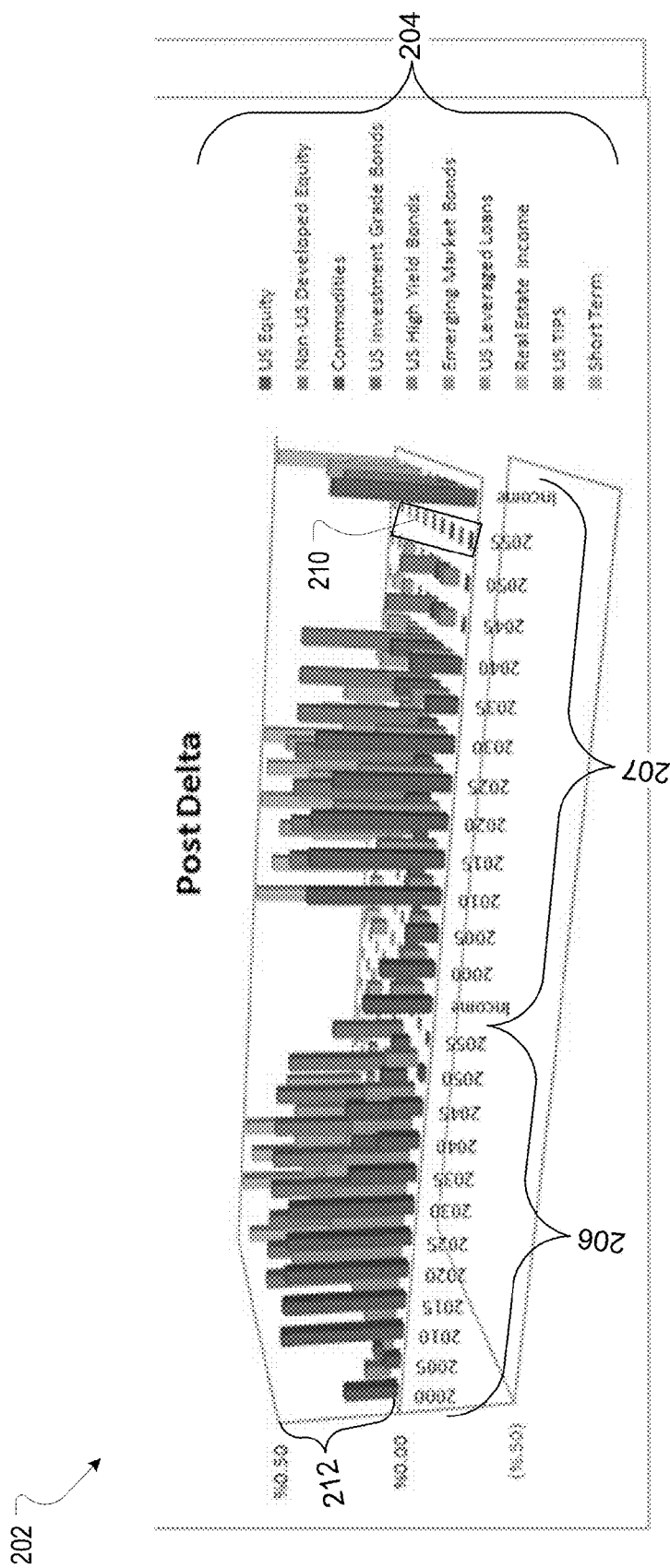

Referring to FIGS. 2A and 2B, the graphs 200 and 202 plot portfolios as the x axis, % differences as the y axis and asset classes as the z axis. FIG. 2A graph 200 displays differences 208 among trade amounts of asset classes 204 in portfolio families 206, 207 and target trade amounts of the asset classes 204, e.g., prior to rebalancing by data engine 109. Portfolio family 206 is a set of related upper level portfolios, with each upper level portfolio in portfolio family 206 being associated with a particular calendar year. Portfolio family 207 is another set of related upper level portfolios, with each upper level portfolio in portfolio family 207 being associated with a particular calendar year. Asset classes 204 include various different asset classes, including, e.g., U.S. equity, non-U.S. developed equity, commodities, U.S. investment grade bonds, U.S. high yield bonds, emerging market bonds, U.S. leveraged loans, real estate income, U.S. TIPS, and short term. Differences 208 represent an amount by which current trade amounts of asset classes 204 in each of the upper level portfolios in portfolio families 206, 207 differ from the target trade amounts of assets classes 204.

Graph 202 displays differences 212 among trade amounts of asset classes 204 in portfolio families 206, 207 and target trade amounts of the asset classes 204, e.g., following rebalancing by data engine 109.

As shown in graph 202, many of differences 212 have decreased values, relative to values of differences 208. That is, data engine's execution of the optimization algorithm to rebalance portfolio families 206, 207 causes a decrease in the difference among actual trade amounts of asset classes 204 and target trade amounts of asset classes 204, relative to the difference among actual trade amounts of asset classes 204 and target trade amounts of asset classes 204 prior to rebalancing. Portion 210 of graph 202 illustrates that for a particular upper level portfolio the differences among actual trade amounts of asset classes 204 and target trade amounts of asset classes 204 is zero. That is, this particular upper level portfolio includes the target trade amounts for asset classes 204.

In a particular example, sets 112, 118 (FIG. 1) may include portfolio families 206, 207. In the example of FIG. 2A, portfolio family 206 includes upper level portfolios (e.g., upper level portfolios pertaining to a particular industry section—Retail) for calendar years 2000, 2005, 2010, 2015, 2020, 2025, 2030, 2035, 2040, 2045, 2050, 2055. In this example, upper level portfolios 114, 116 in set 112 may correspond to one or more of upper level portfolios for calendar years 2000, 2005, 2010, 2015, 2020, 2025, is 2030, 2035, 2040, 2045, 2050 in portfolio family 206.

Portfolio family 207 includes another series of upper level portfolios (e.g., upper level portfolios pertaining to a particular industry section—Income) for calendar years 2000, 2005, 2010, 2015, 2020, 2025, 2030, 2035, 2040, 2045, 2050, 2055. In this example, upper level portfolios 120, 122 in set 118 may correspond to one or more of upper level portfolios for calendar years 2000, 2005, 2010, 2015, 2020, 2025, 2030, 2035, 2040, 2045, 2050 in portfolio family 207.

Referring to FIG. 2B, after rebalancing portfolio family 206 includes upper level portfolios (e.g., upper level portfolios pertaining to a particular industry section—Retail) for calendar years 2000, 2005, 2010, 2015, 2020, 2025, 2030, 2035, 2040, 2045, 2050, 2055. In this example, rebalanced upper level portfolios 132, 134 in rebalanced set 128 may correspond to one or more of the rebalanced upper level portfolios for calendar years 2000, 2005, 2010, 2015, 2020, 2025, 2030, 2035, 2040, 2045, 2050 in rebalanced portfolio family 206.

After rebalancing, portfolio family 207 includes another series of upper level portfolios (e.g., upper level portfolios pertaining to a particular industry section—Income) for calendar years 2000, 2005, 2010, 2015, 2020, 2025, 2030, 2035, 2040, 2045, 2050, 2055. In this example, rebalanced upper level portfolios 136, 138 in rebalanced set 130 may correspond to one or more of rebalanced upper level portfolios for calendar years 2000, 2005, 2010, 2015, 2020, 2025, 2030, 2035, 2040, 2045, 2050 in rebalanced portfolio family 207.

Figure 3:
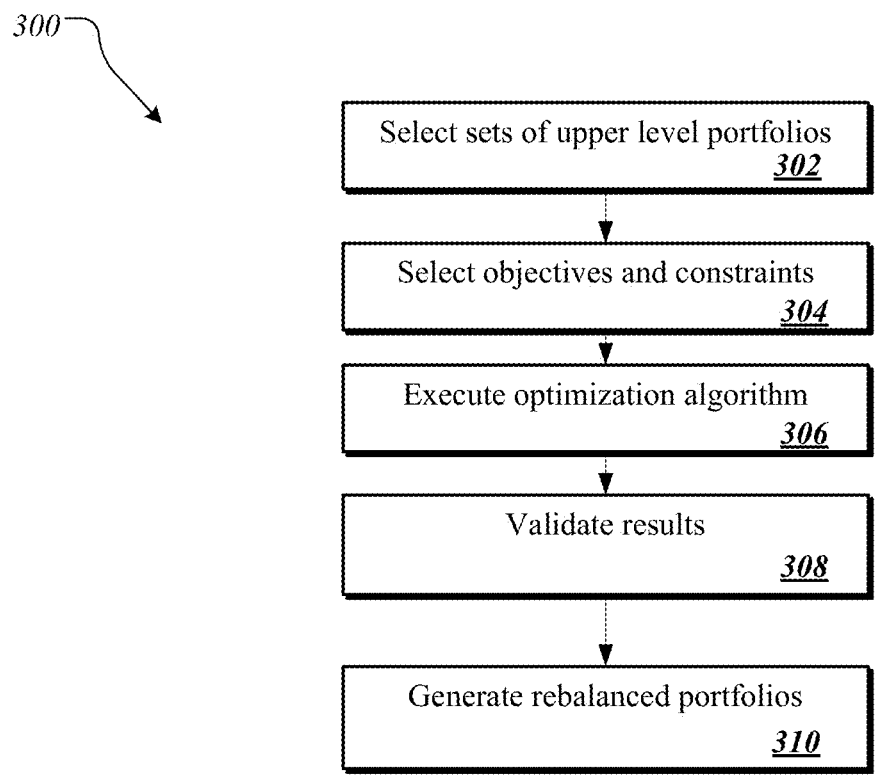
FIG. 3 is a flow chart useful in understanding the system for rebalancing of portfolios.

Referring to FIG. 3, server 108 implements an optimization process 300 for rebalancing upper level portfolios (and/or families of upper level portfolios). In operation, server 108 selects (302) sets of upper level portfolios, including, e.g., sets 112, 118 of upper level portfolios 114, 116, 120, 122 (FIG. 1), respectively. Server 108 also selects (304) various objectives and constraints, with the constraints applying to each of the selected upper level portfolios. That is, the upper level portfolios and/or the underlying lower level portfolios include financial products that are affected by the applied constraints. The selected objectives and constraints may be based on information received from client device 104, including, e.g., information 140 (FIG. 1). Server 108 executes (306) the optimization algorithm (e.g., a series of optimization rules) against the selected sets of upper level portfolios and the selected constraints and objectives. The constraints are applied across the sets of selected portfolios.

In response to execution of the optimization algorithm, server 108 validates (308) the results of execution. The results of execution include proposed rebalanced upper level portfolios, proposed portfolio positions, proposed orders and various metrics. The various metrics include deviation of trade amounts of the rebalanced portfolios to target trade amounts. The various metrics may also include metrics indicative of trade warnings. A trade warning is a notification message that a trade limitation constraint is close to being exceeded and/or is exceeded. In this example, server 108 generates trade warnings, e.g., when rebalancing of upper level portfolios would result in executing trades that may cause a violation of trade limits. Based on the trade warnings, an administrator of system 100 (FIG. 1) may override the rebalancing of the upper level portfolios and instruct server 108 to not generate the rebalanced portfolios.

Server 108 compares the results of execution (e.g., trade warnings and/or an absence of trade warnings) to various threshold values. Based on the comparison, server 108 determines whether the results of execution are satisfactory. If server 108 determines that the results of execution are satisfactory (e.g., based on an absence of trade warnings), server 108 accepts the proposed rebalanced upper level portfolios and generates (310) the rebalanced portfolios. Server 108 generates the rebalanced portfolios by executing trades, purchases and/or sales in accordance with the positions specified by the rebalancing. If server 108 determines that the results of execution are unsatisfactory, server 108 selects a new set of constraints and/or objectives and/or new sets of upper level portfolios to achieve a new rebalancing that is more optimal, e.g., relative to the prior rebalancing.

Figure 4:
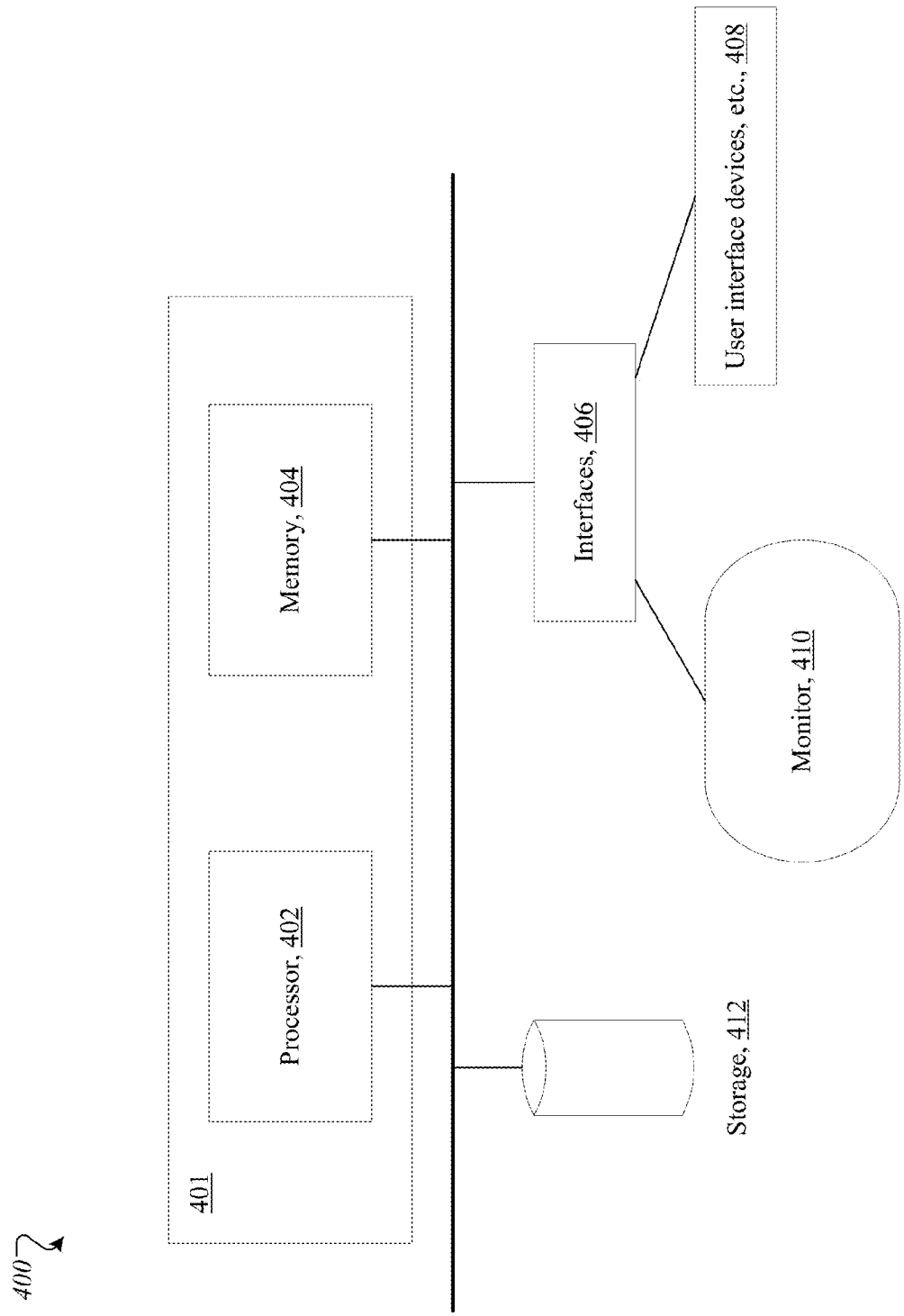
FIG. 4 is a block diagram of typical components for devices in the system of FIG. 1.

FIG. 4 shows details of components of device 401 used in system 100. In an example, device 401 includes a client device (e.g., client device 104). In another example, device 401 includes a server (e.g., server 108). Systems, servers and client devices will typically include a processor 402, memory 404, interfaces 406, storage 412, monitor 410, and user interface devices 408 such as a mouse, etc.

Device 401 can be any sort of computing device capable of taking input from a user and communicating over a network (not shown) with server 108 and/or with other client devices. For example, user devices can be a mobile device, a desktop computer, a laptop, a cell phone, a personal digital assistant ("PDA"), a server, an embedded computing system, a mobile device, a key fob device, and so forth. Client devices can include a monitor that renders visual representations.

Device 401 can also be a server, a distributed computing system, a rack-mounted server, and so forth. Device 401 may be a single server or a group of servers that are at a same location or at different locations.

Device 401 can receive information from a client device, including, e.g., graphical user interfaces. Interfaces 406 can be any type of interface capable of receiving information over a network, such as an Ethernet interface, a wireless networking interface, a fiber-optic networking interface, a modem, and so forth.

Device 401 also includes a processor 402 and memory 404. A bus system (not referenced) can be used to establish and to control data communication.

Processor 402 may include one or more microprocessors. Generally, processor 402 may include any appropriate processor and/or logic that is capable of receiving and storing data, and of communicating over a network (not shown). Memory 404 can include a hard drive and a random access memory storage device, such as a dynamic random access memory, machine-readable media, or other types of non-transitory machine-readable storage devices. Components 400 also include storage device 412, which is configured to store information collected through the brokerage system during a physician's consultation with a patient, as well as an operating system and application software.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A computer-implemented method comprising:
   retrieving information indicative of upper level portfolios, with the upper level portfolios including a plurality of lower level portfolios, with a first upper level portfolio and a second upper level portfolio each including a same lower level portfolio, with a lower level portfolio comprising a group of financial instruments;
   retrieving information indicative of an objective for the first and second upper level portfolios;
   retrieving a constraint restricting trading volumes for the group of financial instruments in the same lower level portfolio across the first and second upper level portfolios, with the constraint comprising a parameter that is at least partly based on the objective of the first and second upper level portfolios;
   executing by one or more computer systems a collection of optimization rules to apply the objective to current trade amounts of the first and second upper level portfolios;
   executing by one or more computer systems an algorithm to apply the at least one constraint to trading volumes for the group of financial instruments in the same lower level portfolio that is included in the first upper level portfolio and in the second upper level portfolio;
   wherein the constraint restricts trading volumes for the group of financial instruments in the same lower level portfolio across the first and second upper level portfolios;
   simultaneously applying, while executing the algorithm to apply the constraint to the same lower level portfolio, the objective to the current trade amounts of the first and the second upper level portfolios that each includes the same lower level portfolio to which the constraint is applied; and
   in response to simultaneously (i) applying the objective to the current trade amounts of the first and the second upper level portfolios that each includes the same lower level portfolio to which the constraint is applied, and (ii) executing the algorithm to apply the constraint to the trading volumes for the group of financial instruments in the same lower level portfolio,
   determining rebalanced trade amounts for the first and second upper level portfolios;
   wherein the determined re-balanced trade amounts (i) promote the objective of the first and the second upper level portfolios, and (ii) satisfy the constraint that restricts the trading volumes across the same lower level portfolio.

2. The method of claim 1, further comprising:
   determining, based on executing the collection of optimization rules and the algorithm, metrics indicative of trade warnings;
   based on the trade warnings, selecting new constraints and new objectives; and
   re-executing by the one or more computer systems the collection of optimization rules to apply across the upper level portfolios to current trade amounts of the upper level portfolios and to the new objectives according to the new constraints to determine new rebalanced trade amounts for the upper level portfolios.

3. The method of claim 1, further comprising:
determining one or more trades to be executed for the rebalanced trade amounts.

4. The method of claim 1, wherein the objective comprises one or more of:
an asset class alignment objective for decreasing differences among trade amounts of an asset class in a portfolio and target trade amounts of the asset class, relative to differences among trade amounts of the asset class and the target trade amounts of the asset class prior to rebalancing;
a peer consistency objective for decreasing across peer upper level portfolios differences among trade amounts in lower level portfolios and target trade amounts, relative to differences across the peer upper level portfolios among trade amounts in lower level portfolios and target trade amounts prior to rebalancing;
wherein at least two upper level portfolios are peer upper level portfolios;
a family consistency objective for decreasing differences among lower level portfolios' trade amounts and target trade amounts across a portfolio family, relative to differences among lower level portfolios' trade amounts and target trade amounts across the portfolio family prior to rebalancing, wherein at least one of the upper level portfolios includes a portfolio family;
a portfolio alignment objective for decreasing differences among lower level portfolios' trade amounts to a target trade amount, with the lower level portfolios being in a particular upper level portfolio, relative to differences among lower level portfolios' trade amounts to the target trade amount prior to rebalancing; and
a trade cost objective for decreasing trade costs associated with management of the upper level portfolios in accordance with the objectives and the constraints.

5. The method of claim 1, wherein the rebalanced trade amounts are optimized trade amounts given the constraint and the objective.

6. The method of claim 1, wherein the constraint comprises one or more of:
a trade limitation constraint for limiting trade of the lower level portfolios across the upper level portfolios;
an asset class alignment tolerance constraint for limiting differences among amounts of asset classes held in a lower level portfolio and objective amounts of the asset classes; and
a portfolio objective alignment tolerance constraint for limiting differences among actual trade amounts of a lower level portfolio and target trade amounts.

7. The method of claim 1, wherein the upper level portfolios are portfolio families.

8. A computer program product tangibly stored on a computer readable storage device, the computer program product comprising instructions for causing a computer system to perform operations comprising:
retrieving information indicative of upper level portfolios, with the upper level portfolios including a plurality of lower level portfolios, with a first upper level portfolio and a second upper level portfolio each including a same lower level portfolio, with a lower level portfolio comprising a group of financial instruments;
retrieving information indicative of an objective for the first and second upper level portfolios;
retrieving a constraint restricting trading volumes for the group of financial instruments in the same lower level portfolio across the first and second upper level portfolios, with the constraint comprising a parameter that is at least partly based on the objective of the first and second upper level portfolios;
executing a collection of optimization rules to apply the objective to current trade amounts of the first and second upper level portfolios;
executing an algorithm to apply the at least one constraint to trading volumes for the group of financial instruments in the same lower level portfolio that is included in the first upper level portfolio and in the second upper level portfolio;
wherein the constraint restricts trading volumes for the group of financial instruments in the same lower level portfolio across the first and second upper level portfolios;
simultaneously applying, while executing the algorithm to apply the constraint to the same lower level portfolio, the objective to the current trade amounts of the first and the second upper level portfolios that each includes the same lower level portfolio to which the constraint is applied; and
in response to simultaneously (i) applying the objective to the current trade amounts of the first and the second upper level portfolios that each includes the same lower level portfolio to which the constraint is applied, and (ii) executing the algorithm to apply the constraint to the trading volumes for the group of financial instruments in the same lower level portfolio,
determining rebalanced trade amounts for the first and second upper level portfolios;
wherein the determined re-balanced trade amounts (i) promote the objective of the first and the second upper level portfolios, and (ii) satisfy the constraint that restricts the trading volumes across the same lower level portfolio.

9. The computer program product of claim 8, wherein the operations further comprise:
determining, based on executing the collection of optimization rules and the algorithm, metrics indicative of trade warnings;
based on the trade warnings, selecting new constraints and new objectives; and
re-executing by the one or more computer systems the collection of optimization rules to apply across the upper level portfolios to current trade amounts of the upper level portfolios and to the new objectives according to the new constraints to determine new rebalanced trade amounts for the upper level portfolios.

10. The computer program product of claim 8, wherein the operations further comprise:
determining one or more trades to be executed for the rebalanced trade amounts.

11. The computer program product of claim 8, wherein the objective comprises one or more of:
an asset class alignment objective for decreasing differences among trade amounts of an asset class in a portfolio and target trade amounts of the asset class, relative to differences among trade amounts of the asset class and the target trade amounts of the asset class prior to rebalancing;
a peer consistency objective for decreasing across peer upper level portfolios differences among trade amounts in lower level portfolios and target trade amounts, relative to differences across the peer upper level portfolios among trade amounts in lower level portfolios and target trade amounts prior to rebalancing;

wherein at least two upper level portfolios are peer upper level portfolios;

a family consistency objective for decreasing differences among lower level portfolios' trade amounts and target trade amounts across a portfolio family, relative to differences among lower level portfolios' trade amounts and target trade amounts across the portfolio family prior to rebalancing, wherein at least one of the upper level portfolios includes a portfolio family;

a portfolio alignment objective for decreasing differences among lower level portfolios' trade amounts to a target trade amount, with the lower level portfolios being in a particular upper level portfolio, relative to differences among lower level portfolios' trade amounts to the target trade amount prior to rebalancing; and a trade cost objective for decreasing trade costs associated with management of the upper level portfolios in accordance with the objectives and the constraints.

12. The computer program product of claim 8, wherein the rebalanced trade amounts are optimized trade amounts given the constraint and the objective.

13. The computer program product of claim 8, wherein the constraint comprises one or more of:

a trade limitation constraint for limiting trade of the lower level portfolios across the upper level portfolios;

an asset class alignment tolerance constraint for limiting differences among amounts of asset classes held in a lower level portfolio and objective amounts of the asset classes; and a portfolio objective alignment tolerance constraint for limiting differences among actual trade amounts of a lower level portfolio and target trade amounts.

14. The computer program product of claim 8, wherein the sets of upper level portfolios are portfolio families.

15. An apparatus comprising:

a processor; and a computer program product stored on a computer readable medium, the computer program product comprising instructions for causing the processor to perform operations comprising:

retrieving information indicative of upper level portfolios, with the upper level portfolios including a plurality of lower level portfolios, with a first upper level portfolio and a second upper level portfolio each including a same lower level portfolio, with a lower level portfolio comprising a group of financial instruments;

retrieving information indicative of an objective for the first and second upper level portfolios;

retrieving a constraint restricting trading volumes for the group of financial instruments in the same lower level portfolio across the first and second upper level portfolios, with the constraint comprising a parameter that is at least partly based on the objective of the first and second upper level portfolios;

executing a collection of optimization rules to apply the objective to current trade amounts of the first and second upper level portfolios;

executing an algorithm to apply the at least one constraint to trading volumes for the group of financial instruments in the same lower level portfolio that is included in the first upper level portfolio and in the second upper level portfolio;

wherein the constraint restricts trading volumes for the group of financial instruments in the same lower level portfolio across the first and second upper level portfolios;

simultaneously applying, while executing the algorithm to apply the constraint to the same lower level portfolio, the objective to the current trade amounts of the first and the second upper level portfolios that each includes the same lower level portfolio to which the constraint is applied; and in response to simultaneously (i) applying the objective to the current trade amounts of the first and the second upper level portfolios that each includes the same lower level portfolio to which the constraint is applied, and (ii) executing the algorithm to apply the constraint to the trading volumes for the group of financial instruments in the same lower level portfolio, determining rebalanced trade amounts for the first and second upper level portfolios;

wherein the determined re-balanced trade amounts (i) promote the objective of the first and the second upper level portfolios, and (ii) satisfy the constraint that restricts the trading volumes across the same lower level portfolio.

16. The apparatus of claim 15, wherein the operations further comprise:

determining, based on executing the collection of optimization rules and the algorithm, metrics indicative of trade warnings;

based on the trade warnings, selecting new constraints and new objectives; and re-executing by the one or more computer systems the collection of optimization rules to apply across the upper level portfolios to current trade amounts of the upper level portfolios and to the new objectives according to the new constraints to determine new rebalanced trade amounts for the upper level portfolios.

17. The apparatus of claim 15, wherein the operations further comprise:

determining one or more trades to be executed for the rebalanced trade amounts.

18. The apparatus of claim 15, wherein the objective comprises one or more of:

an asset class alignment objective for decreasing differences among trade amounts of an asset class in a portfolio and target trade amounts of the asset class, relative to differences among trade amounts of the asset class and the target trade amounts of the asset class prior to rebalancing;

a peer consistency objective for decreasing across peer upper level portfolios differences among trade amounts in lower level portfolios and target trade amounts, relative to differences across the peer upper level portfolios among trade amounts in lower level portfolios and target trade amounts prior to rebalancing;

wherein at least two upper level portfolios are peer upper level portfolios;

a family consistency objective for decreasing differences among lower level portfolios' trade amounts and target trade amounts across a portfolio family, relative to differences among lower level portfolios' trade amounts and target trade amounts across the portfolio family prior to rebalancing, wherein at least one of the upper level portfolios includes a portfolio family;

a portfolio alignment objective for decreasing differences among lower level portfolios' trade amounts to a target trade amount, with the lower level portfolios being in a particular upper level portfolio, relative to differences among lower level portfolios' trade amounts to the target trade amount prior to rebalancing; and a trade cost objective for decreasing trade costs associated with management of the upper level portfolios in accordance with the objectives and the constraints.

19. The apparatus of claim 15, wherein the rebalanced trade amounts are optimized trade amounts given the constraint and the objective.

20. The apparatus of claim 15, wherein the constraint comprises one or more of:

a trade limitation constraint for limiting trade of the lower level portfolios across the upper level portfolios;

an asset class alignment tolerance constraint for limiting differences among amounts of asset classes held in a lower level portfolio and objective amounts of the asset classes; and a portfolio objective alignment tolerance constraint for limiting differences among actual trade amounts of a lower level portfolio and target trade amounts.

* * * * *

UNITED STATES PATENT AND TRADEMARK OFFICE
CERTIFICATE OF CORRECTION

| | | |
|---|---|---|
| PATENT NO. | : 8,676,690 B1 | Page 1 of 1 |
| APPLICATION NO. | : 13/706626 | |
| DATED | : March 18, 2014 | |
| INVENTOR(S) | : Douglas Sprague et al. | |

It is certified that error appears in the above-identified patent and that said Letters Patent is hereby corrected as shown below:

Title Page, Item (75) (Inventors), please delete "MacDermott" and insert -- Mac Dermott --

Signed and Sealed this
Sixteenth Day of September, 2014

Michelle K. Lee
*Deputy Director of the United States Patent and Trademark Office*